(12) United States Patent
Katayama et al.

(10) Patent No.: US 6,659,614 B2
(45) Date of Patent: Dec. 9, 2003

(54) VARIABLE DISPERSION COMPENSATOR AND OPTICAL TRANSMISSION SYSTEM

(75) Inventors: Makoto Katayama, Yokohama (JP); Tomohiko Kanie, Yokohama (JP); Masayuki Nishimura, Yokohama (JP); Shunichi Tsuchiya, Sagamihara (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 25 days.

(21) Appl. No.: 10/114,322

(22) Filed: Apr. 3, 2002

(65) Prior Publication Data
US 2003/0002772 A1 Jan. 2, 2003

(30) Foreign Application Priority Data
Jun. 13, 2001 (JP) ...................................... P2001-179088

(51) Int. Cl.[7] .............................. G02B 5/08; G02B 7/182
(52) U.S. Cl. ........................... 359/846; 385/15; 398/48; 398/81
(58) Field of Search ................................. 359/298, 846, 359/847, 849, 877, 577, 615; 385/15, 18, 31; 398/48, 79, 81

(56) References Cited

U.S. PATENT DOCUMENTS 4,043,644 A * 8/1977 Humphrey .................. 359/846
4,664,488 A * 5/1987 Sawicki et al. ............. 359/849
5,089,915 A * 2/1992 Gobeli ....................... 359/846

OTHER PUBLICATIONS

A. Hirano, et al, "Wide–Band WDM Transmission Experiment Using Dispersion Slope Compensator Based on Time–Space Conversion" The Institute of Electronics, Information and Communication Engineers, 2000, Technical Report of IEICE, pp. 23–28.

K. Takiguchi, "Trend of Terabit Optical Communication System Technology", vol. 22, No. 9, O Plus E, pp. 1151–1158 (w/English translation).

M. Shirasaki, et al "Variable Dispersion Compensator Using the Virtually Imaged Phased Array (VIPA) for 10–Gbit/S WDM Transmission Systems" 2 pages.

* cited by examiner

Primary Examiner—Mark A. Robinson
(74) Attorney, Agent, or Firm—McDermott, Will & Emery

(57) ABSTRACT

An optical signal, which is to become the subject of dispersion compensation, is split by optical combining/splitting unit 2, and each frequency component of the optical signal that is split is reflected by each reflective surface of reflective mirror 40 of reflective means 4 to apply a predetermined phase shift to the respective frequency components. Each reflected frequency component is then combined using optical combining/splitting unit 2, to give dispersion compensated optical signal. Furthermore, in regards to reflective means 4, which is used to apply phase shift to each frequency component of an optical signal, reflective mirror 40 is made a variable movable mirror by reflection position at each reflective surface, which reflects the frequency components, deforming the entire reflective surface. This allows dispersion that is created in an optical signal to be compensated with favorable controllability and high accuracy. As a result, it becomes possible to provide a variable dispersion compensator that presents high precision and controllability of dispersion compensation, and has a miniaturized optical circuit, and an optical transmission system comprising such variable dispersion compensator.

5 Claims, 12 Drawing Sheets

OPTICAL SIGNAL $2\delta\nu$

VARIABLE DISPERSION COMPENSATOR AND OPTICAL TRANSMISSION SYSTEM

BACKGROUND OF THE INVENTION

1. Field of the Invention

The present invention relates to a variable dispersion compensator, which compensates for dispersion that develops in an optical signal due to its propagation through an optical transmission line such as an optical fiber transmission line, and an optical transmission system in which it is provided.

2. Description of the Related Art

In an optical transmission system in which optical signals are propagated by optical fiber transmission lines and the like, dispersion accumulates in optical components of each frequency (each wavelength) that is included in an optical signal through the dispersion that exists in an optical fiber. In this regard, it is desired that the amount of dispersion in an optical transmission system be reduced in the frequency band that includes optical signal frequencies in order to suppress waveform deterioration of an optical signal due to propagation along an optical transmission line. In addition, it wavelength division multiplexing (WDM) transmission systems, which propagate multi-wavelength optical signals, in the same manner, it is necessary to reduce the amount of dispersion in the frequency band that includes optical signal frequencies (optical signal wavelengths) of the respective multi-wavelength optical signals.

To compensate dispersion that accumulates in each frequency component of an optical signal, a dispersion compensator is provided upon an optical transmission line. With a dispersion compensator, the dispersion that develops in an optical signal is compensated by applying an appropriate phase shift to an optical signal. Such an optical compensator is disclosed in, for example, Document 1 [The Journal of the Institute of Electronics, Information and Communication Engineers (Shingaku Gihou) Vol. 100, No. 379, OCS2000-61], Document 2 [O plus E Vol. 22, No. 9, p. 1151], and Document 3 [OFC2000, Shirasaki, et al., Variable Dispersion Compensator Using The Virtually Imaged Phased Array (VIPA) for 40-Gbit/s WDM Transmission Systems].

SUMMARY OF THE INVENTION

In recent years, due to the expansion of optical transmission systems, dispersion compensation with even higher accuracy is possible in dispersion compensators configured upon optical transmission lines, and there are also demands for dispersion compensators with superior controllability of dispersion compensation. In this regard, sufficient controllability and accuracy of dispersion compensation cannot be obtained with conventional dispersion compensators.

For example, the dispersion compensator disclosed in the above-mentioned Document 1 is configured comprising arrayed-waveguide grating (AWG). Phase adjustment is performed by the spatial phase filter for each frequency component of an optical signal that is input from the first slab waveguide side of the AWG, and output from the second slab waveguide on the opposite side to compensate the dispersion of an optical signal. However, with such configuration, since a spatial phase filter is used for phase adjustment of each frequency component of the optical signal, the applied phase shift is fixed so that dispersion compensation cannot be adjusted.

Furthermore, the dispersion compensator disclosed in Document 2 is configured so as to use a planar waveguide type optical circuit with a variable optical path difference with a Mach Zender interferometer (MZI) to perform dispersion compensation. However, with such configuration, the structure of the optical circuit becomes complex, and its size also becomes large (e.g., approximately 5 cm$^2$). In addition, the response of phase adjustment is low (e.g., approximately 10 ms).

Furthermore, with the dispersion compensator disclosed in Document 3, a device that propagates an optical signal through space is used to change optical path length; however, with such configuration, the system is large, and highly accurate phase adjustment is difficult. In addition, the insertion loss into the optical fiber transmission line is large, for instance, 10 dB or greater The present invention has come about in order to solve the problems mentioned above, and aims to provide a variable dispersion compensator, and an optical transmission system equipped therewith, which have superior controllability and accuracy of dispersion compensation while also allowing size reduction of that optical circuit.

In order to achieve such an objective, the variable dispersion compensator according to the present invention is a variable dispersion compensator, which applies a phase shift to an optical signal to compensate dispersion in the optical signal, and is characterized by comprising (1) optical splitting means, which inputs an optical signal that is to become the subject of dispersion compensation, and splits the optical signal for every frequency component within a predetermined frequency band (2) reflecting means, which reflects each of the respective frequency components that are split by the optical splitting means to apply a predetermined phase shift to each frequency component, and is configured with the reflection position for each of the respective frequency components being movable in the direction of optical signal propagation; and (3) optical combining means, which combines the frequency components reflected by the reflecting means to give a dispersion compensated optical signal, wherein the reflective means is constituted by a single reflective mirror; the single reflective mirror is a movable mirror capable of moving each of its reflective surfaces corresponding to the frequency component in the optical signal propagation direction by deforming the entire reflective surface thereof; and wherein the movable mirror, which is the single reflective mirror, is designed such that the entire reflective surface thereof is deformed by applying a moment to application portions provided respectively to the vicinity of the end portion on both sides by means of a moment application means, while fixing a fixed portion provided to the vicinity of the center thereof.

In the variable dispersion compensator mentioned above, the difference in optical path length from an optical splitting means, through a reflecting means, until an optical combining means is used to apply a predetermined phase shift to each frequency component of an optical signal. Then through the use of the reflecting means having a movable reflection position for each frequency component, the phase shift applied to each frequency component is made variable.

With such configuration, it is possible to compensate dispersion that develops in an optical signal with high accuracy. Furthermore, by adjusting the reflection position at the reflecting means relative to each frequency component, it is possible to control the dispersion compensation due to application of a phase shift. Furthermore, since dispersion compensation is controlled with only the reflecting means, it is possible to simplify the structure of the optical circuit, and accordingly, allow for the size reduction of the optical circuit Moreover, according to the structure deforming the portion in the vicinity of the end portion of the movable mirror with a moment application meals as described above, the force necessary in application for deforming the movable mirror becomes small, and the entire reflective surface thereof can be deformed easier.

In addition, an optical transmission system according to the present invention is characterized by comprising (a) an optical transmission line, which propagates an optical signal having a frequency component within a predetermined frequency band; and (b) the variable dispersion compensator mentioned above, which is disposed at a predetermined position upon the optical transmission line and compensates dispersion that develops in the optical signal propagated through the optical transmission line.

Through this, dispersion that develops in an optical signal that propagates through an optical transmission line such as an optical fiber transmission line may be compensated with favorable controllability and high accuracy to achieve an optical transmission system that prevents waveform deterioration of an optical signal.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, the preferred embodiments of a variable dispersion compensator and optical transmission system according to the present invention, together with drawings, are described in detail. It is noted here that in the description of drawings the same elements are given the same reference markers, and repetitive descriptions are omitted. In addition, the measurement scale of the drawings does not always match that of the description.

Figure 1:
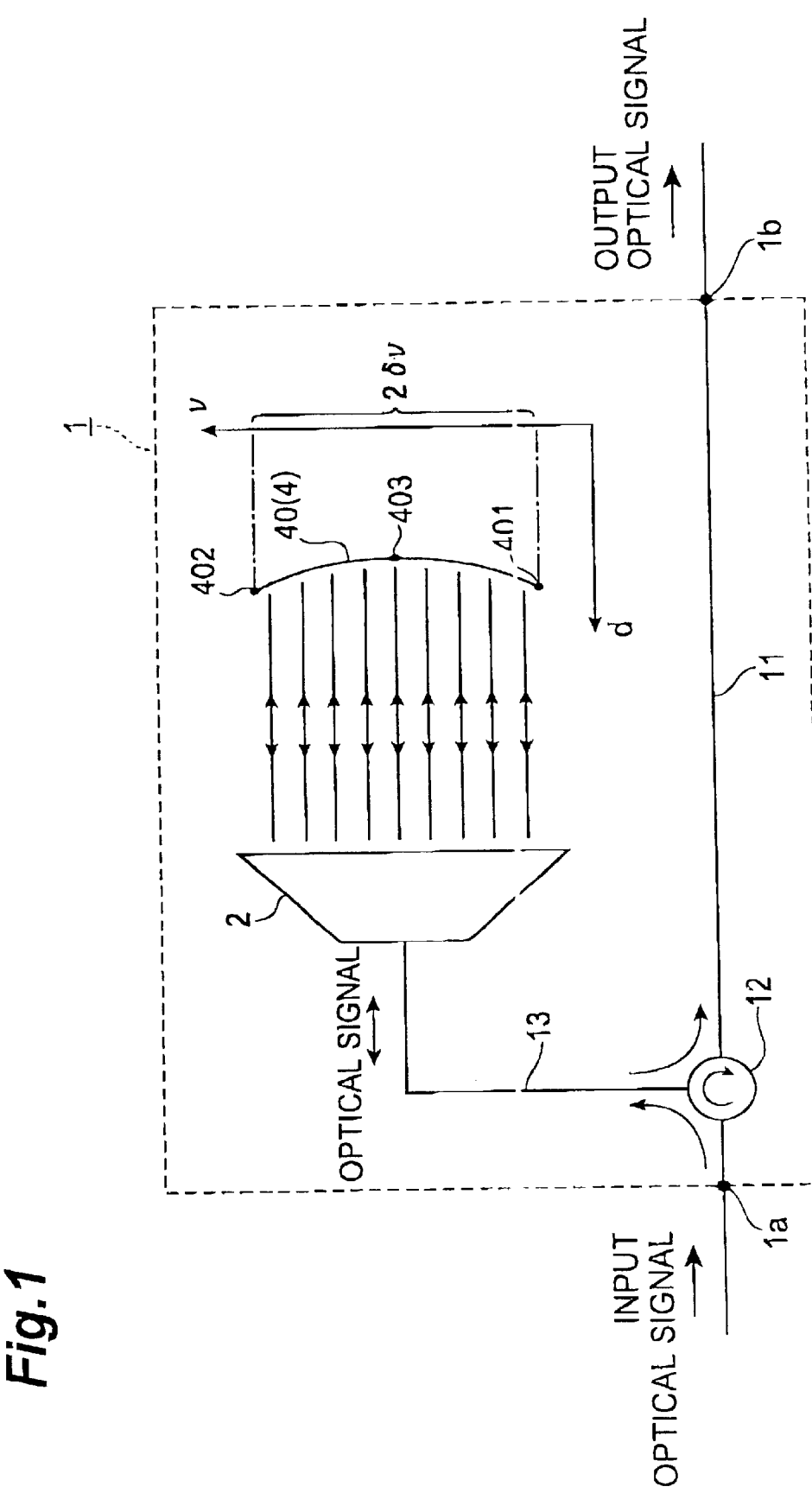
FIG. 1 is a block diagram that illustratively shows the one of the embodiments of a variable dispersion compensator.

To begin with, the schematic of a variable dispersion compensator is described. FIG. 1 is a block diagram that illustratively shows the one of the embodiments of a variable dispersion compensator according to the present invention. Variable dispersion compensator 1 of this embodiment applies a predetermined amount of phase shift to an input optical signal to compensate the dispersion of the optical signal, and is configured comprising optical combining/splitting unit 2 and reflective means 4. In addition, regarding the dispersion compensation functionally, the amount of phase shift that is applied to each frequency component of the optical signal for dispersion compensation is variable.

An optical signal, which is to become the subject of dispersion compensation and which has a frequency component (wavelength component) within a predetermined frequency band (wavelength band), is input from input terminal 1a of variable dispersion compensator 1, and after a predetermined phase shift is applied, is output as a dispersion compensated optical signal from output terminal 1b. Between input terminal 1a and output terminal 1b, there is provided optical transmission line 11 through which an optical signal is propagated.

Optical circulator 12 is provided at a predetermined position upon optical transmission line 11. In addition, optical transmission line 13, which is used for dispersion compensation, is connected to optical circulator 12. Through this, the pre-dispersion compensation optical signal from the input terminal 1a side of optical transmission line 11 passes through optical circulator 12 to be output towards optical transmission line 13. In addition, the post-dispersion compensation optical signal from optical transmission line 13 passes through optical circulator 12 to be output towards the output terminal 1b side of optical transmission line 11.

The aforementioned optical combining/splitting unit 2 and reflective means 4, in such order, are disposed at the end of the side opposite optical circulator 12 of dispersion compensation optical transmission line 13. In accordance with this optical combining/splitting unit 2 and this reflective means 4, phase shift is applied to an optical signal to compensate the dispersion thereof.

Optical combining/splitting unit 2 is a single optical combining/splitting means, which functions as an optical splitting means that inputs the pre-dispersion compensation optical signal and splits every frequency component of the optical signal within a predetermined frequency band, and functions as an optical combining means that combines each frequency component of the optical signal to give the post-dispersion compensation optical signal. The optical signal that is to become the subject of dispersion compensation, in this optical combining/splitting unit 2, is split or combined by frequency ν (or wavelength λ) along a predetermined splitting direction (direction of the ν-axis in FIG. 1).

In addition, reflective means 4 is a reflecting means that reflects the respective frequency components of the optical signal that is split by optical combining/splitting unit 2 to apply a predetermined phase shift to each frequency component. Phase shift is applied to each frequency component of the optical signal using the optical path length and optical path length differences from optical combining/splitting unit 2 (optical splitting means) through reflective means 4 reflecting means until again reaching optical combining/splitting unit 2 (optical combining means). In addition, this reflective means 4 is configured to be variable in terms of the reflecting point for the respective frequency components along the direction of optical signal propagation (direction of the d-axis shown in FIG. 1).

Reflective means 4, which is a reflecting means in this embodiment, is structured from a single reflective mirror 40. This single reflective mirror 40 is disposed in the direction of the ν-axis, which is the direction of the splitting of optical signal and approximately perpendicular to the direction of optical signal propagation, as the direction of spread of reflective surface; and in accordance with this, reflective means 4, which reflects the respective frequency components of the optical signal within the entire frequency band that is to be subjected to dispersion compensation, is formed.

Further, reflective mirror 40 structuring reflective means 4 is a movable mirror capable of moving each of its reflective surfaces corresponding to the frequency component in the d-axis direction, which is the optical signal propagation direction, by deforming the entire reflective surface thereof. Specifically, with reflective mirror 40, fixed portion 403 provided to the vicinity of the center thereof is fixed, and moment application means (not shown) is provided to application portions 401, 402 provided respectively to the vicinity of the end portion on both sides. And, the entire reflective surface of the reflective mirror 40 is deformed by applying a moment to the application portions 401, 402 with the moment application means.

In the above configuration, the optical signal, which is the subject of dispersion compensation and input to variable dispersion compensator 1 from input terminal 1a, is input to optical combining/splitting unit 2 through optical transmission line 11, optical circulator 12, and optical transmission line 13; and each frequency component is split off according to such frequency ν. Each frequency component of the optical signal that has been split is propagated towards reflective means 4, and is reflected at a predetermined reflection position by corresponding reflective surface of reflective mirror 40. Each frequency component that has been reflected is then combined again by optical combining/splitting unit 2 to become a post-dispersion compensation optical signal, and is output to an external portion from output terminal 1b through optical transmission line 13, optical circulator 12, and optical transmission line 11.

Here, the reflection position of a frequency component of the optical signal in each reflective surface with reflective mirror 40 of reflective means 4 is determined based on the amount of phase shift that should be applied to that frequency component. The deformation of the reflective surface of reflective mirror 40, which is a movable mirror, is controlled by the moment application means so as to move the respective reflective surfaces in the direction of optical signal propagation and into the set reflection position; as a result, dispersion compensation of the optical signal is achieved within the entire frequency band.

Figure 2:
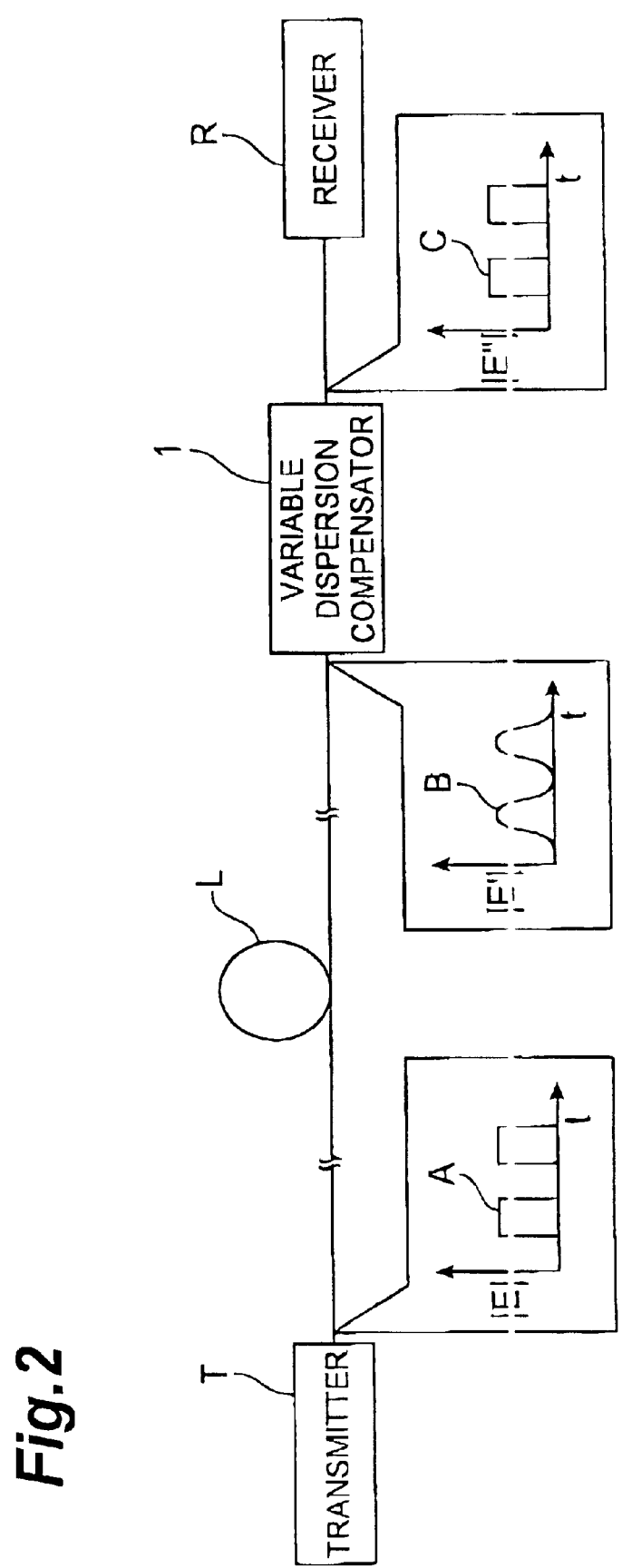
FIG. 2 is a block diagram that illustratively shows the one of the embodiments of an optical transmission system.

Next, the optical transmission system comprising the variable dispersion compensator mentioned above is described. FIG. 2 is a block diagram that illustratively shows the one of the embodiments of an optical transmission system according to the present invention.

The optical transmission system of this embodiment is configured comprising transmitter (transmitting station) T, which transmits an optical signal; optical fiber transmission line L, which is an optical transmission line that propagates the optical signal that is transmitted from transmitter T; and receiver (receiving station) R, which receives the optical signal that is propagated through optical fiber transmission line L.

Variable dispersion compensator 1, which has the configuration shown in FIG. 1 is disposed at a predetermined position upon optical fiber transmission line L. This variable dispersion compensator 1 is preferably provided at a position upon optical fiber transmission line L that is near receiver R, for instance, at a position that is immediately before receiver R. Through this, dispersion compensation can be performed for the dispersion that has accumulated in the optical signal propagating from transmitter T towards receiver R through optical fiber transmission line L using variable dispersion compensator 1 before the optical signal is received by receiver R.

In the variable dispersion compensator and optical transmission system according to this embodiment, where the optical signal that is split by the optical splitting means, optical combining/splitting unit 2, travels until it is combined again by the optical combining means, optical combining/splitting unit 2, is used to apply phase shift to each frequency component of the optical signal. Then as for reflective mirror 40, which is the reflecting means 4 and which is used for setting the optical path length and phase shift for each frequency component, the reflection position of the respective reflective surfaces corresponding to the frequency component is made variable by deforming the entire reflective surface of reflective mirror 40.

Through this, since the phase shift that is applied to each frequency component is variable, it becomes possible to perform discretionary phase adjustment, and makes it possible to compensate the dispersion that develops in an optical signal with high accuracy. Furthermore, since it is possible to control the reflection position of the respective frequency components by deforming reflective mirrors 40 structuring reflective means 4, the amount of phase shift that is applied to the optical signal can be controlled with favorable controllability, thereby making it possible to set or change the details of the conditions of dispersion compensation in a favorable manner.

Moreover, according to the structure deforming portions 401, 402 in the vicinity of the end portion of reflective mirror 40, which is the movable mirror, with a moment application means as described above, the force necessary in application for deforming the movable mirror becomes small, and the entire reflective surface thereof can be deformed easier.

Moreover, since the control of dispersion compensation is performed only with the reflecting means, it is possible to simplify the structure of the optical circuit and allow for the size reduction of the optical circuit. It is noted here that such a reflecting means may be manufactured using, for instance, Micro Electro Mechanical System (MEMS) technology.

With an optical transmission system that applies a variable dispersion compensator having such structure, dispersion that develops in optical signal that propagates through an optical transmission line, such as optical fiber transmission line L may be compensated having favorable controllability and high accuracy to achieve an optical transmission system that reliably prevents waveform deterioration of an optical signal.

It is noted here that with variable dispersion compensator 1 shown in FIG. 1, single optical combining/splitting unit 2 is used as optical splitting means for splitting a pre-dispersion compensation optical signal into frequency components, and as optical combining means for combining frequency components to give a post-dispersion compensation optical signal. Accordingly, the structure of variable dispersion compensator 1 is simplified to allow the further size reduction of such optical circuit. However, such optical splitting means and optical combining means may even be configured separately.

Figure 3:
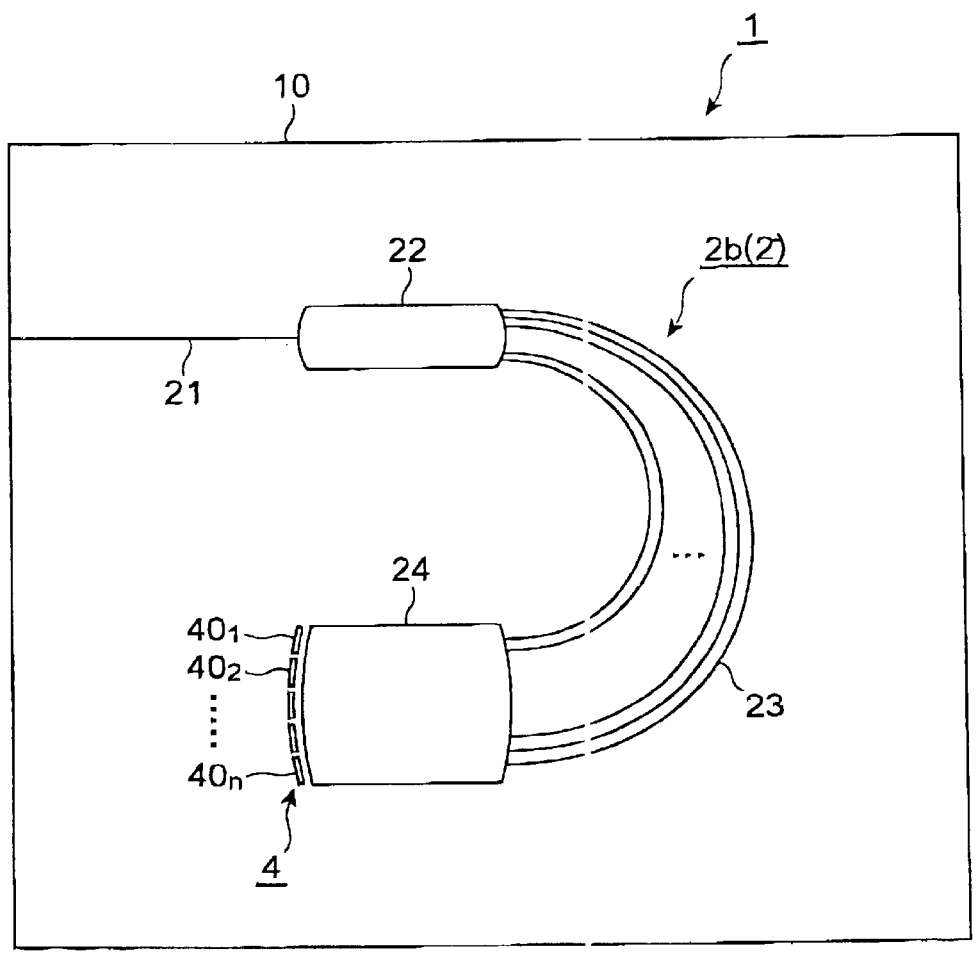
FIG. 3 is a planar view showing a more specific structural example of a variable dispersion compensator according to the embodiment shown in FIG. 1.

FIG. 3 is a planar view showing a more specific structural example of the variable dispersion compensator according to this embodiment that is shown in FIG. 1. It is noted here that in FIG. 3, optical transmission line 11 and optical circulator 12, etc. are not shown, but only the optical circuit comprising optical combining/splitting unit 2 and reflective means 4, which actually perform dispersion compensation of an optical signal, is shown.

In variable dispersion compensator 1 of this example, arrayed waveguide grating (AWG) 2b with a planar waveguide type optical circuit that is formed in a predetermined waveguide pattern upon substrate 10 is used as optical combining/splitting unit 2, which splits and alternately combines an optical signal that is to become the subject of dispersion compensation.

AWG 2b is configured including input/output channel waveguide 21, the end thereof being made into an input/output port; first slab waveguide 22, which is connected to input/output channel waveguide 21; array waveguide portion 23, which comprises a plurality of channel waveguides that are connected to first slab waveguide 22 with each differing in optical path length from the others; and second slab waveguide 24, which is connected to array waveguide portion 23. Moreover, movable reflective mirror 40, which is reflective means 4, is provided to the side opposite array waveguide portion 23 of second slab waveguide 24.

Here, with variable dispersion compensator 1 illustrated in FIG. 3, shown is a structural example where n number of movable reflective mirrors $40_1$ to $40_n$ is provided as reflective means 4. Each of these movable reflective mirrors $40_1$ to $40_n$ corresponds to reflective mirror 40 illustrated in FIG. 1, respectively. In other words, in this structural example, the frequency band of the optical signal, which is the subject of dispersion compensation, is divided into n number of bands, and, dispersion compensation is performed within the respective frequency bands by providing a single movable reflective mirror 40 illustrated in FIG. 1 for each n number of frequency bands divided as described above.

Each of reflective mirrors $40_1$ to $40_n$ structuring reflective means 4 is a movable mirror capable of moving each of the reflective surfaces corresponding to each frequency component in the optical signal propagation direction by deforming its entire reflective surface. The deformation method of the reflective surface is as per the description of reflective mirror 40 illustrated in FIG. 1.

In the above configuration, when an optical signal is input to input/output channel waveguide 21 from the input/output port of AWG 2b, the optical signal is split into every frequency (every wavelength) while being guided through first slab waveguide 22, array waveguide portion 23, and second slab waveguide 24, in that order.

Each frequency component of the optical signal that has been split is reflected with corresponding movable reflective mirrors $40_1$ to $40_n$ of reflective means 4 per frequency band divided into n numbers. Each frequency component is then combined while being guided through second slab waveguide 24, array waveguide portion 23, and first slab waveguide 22, in that order, outputting the dispersion compensated optical signal from the input/output port through input/output channel waveguide 21.

Further, the reflective means structured from n number of reflective mirrors illustrated in FIG. 3, for example, may be used in cases when n channels of optical signals each having a different wavelength are the subject of dispersion compensation. Here, dispersion compensation is performed by reflecting the optical signal with a movable reflective mirror corresponding to each of the n channels of optical signals.

Generally, it is preferable to set the number of movable reflective mirrors in accordance with the number of channels of optical signals subject to dispersion compensation or the broadness of the frequency band of the optical signal. For example, when the optical signal is 1 channel, or when the frequency band is relatively narrow in a plurality of channels, the structure may be such that n=1 as shown in FIG. 1 and to provide one movable reflective mirror 40 for the entire exit of second slab waveguide 24.

In variable dispersion compensator 1 illustrated in FIG. 1 and FIG. 3, the structure and driving method of movable reflective mirror 40 used as reflective means 4 are now described in further detail.

Figure 4A:
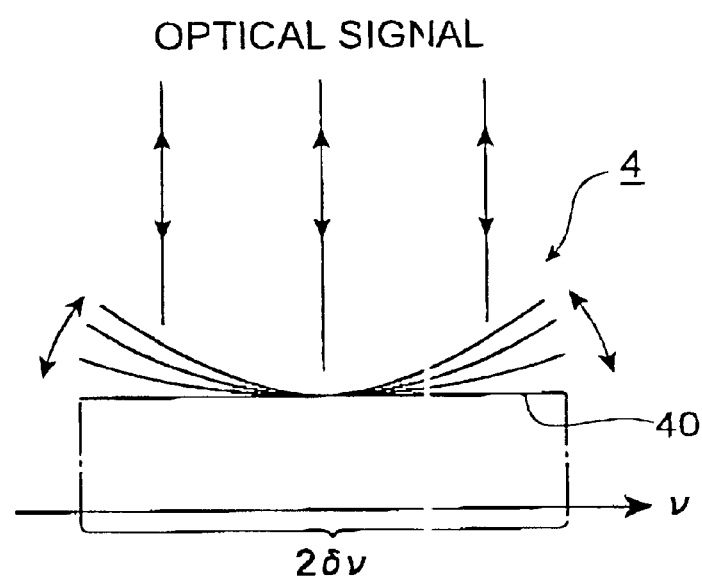
FIG. 4A and FIG. 4B are diagrams showing an example of the movable reflective mirror.
Figure 4B:
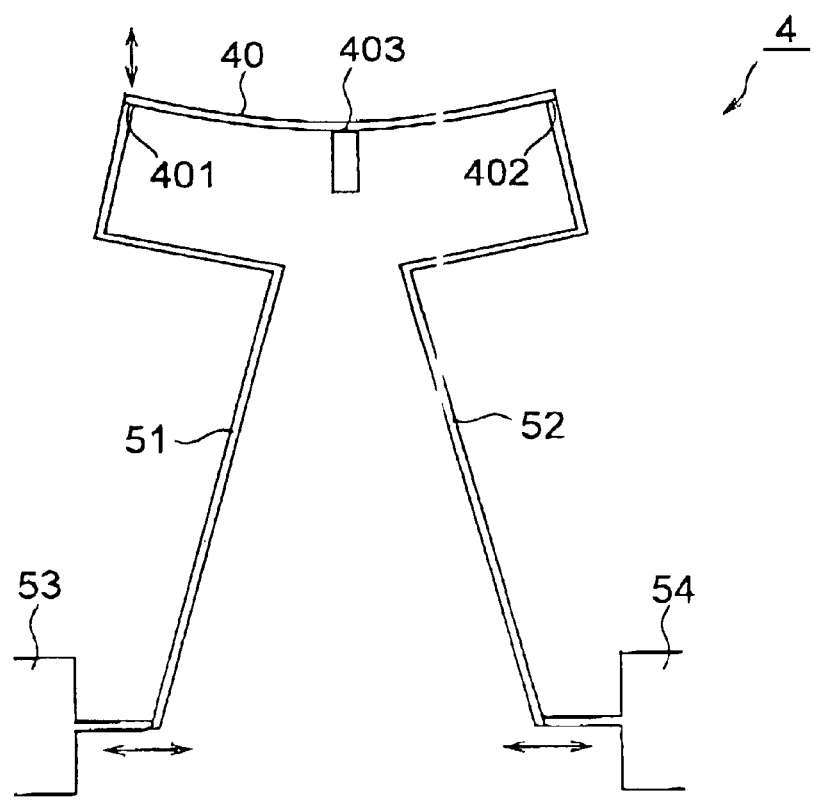

FIG. 4A and FIG. 4B are diagrams showing a movable reflective mirror when using a single reflective mirror as the reflective means in the variable dispersion compensator, and FIG. 4A is a diagram showing schematically the shape and driving method thereof, and FIG. 4B is a specific structural example thereof.

Reflective means 4 shown in FIG. 4A and FIG. 4B, as described with respect to reflective means 4 illustrated in FIG. 1, is structured of a single movable reflective mirror 40. This movable reflective mirror 40 as shown in FIG. 4A, is capable of moving each of the reflective surfaces corresponding to the respective frequency components of the optical signal in the optical signal propagation direction by deforming the entire reflective surface thereof in a curved surface shape (deformation in a parabolic shape, for example). Dispersion compensation may thereby be conducted variably high favorable precision.

FIG. 4B is a structural diagram showing an example of the movable reflective mirror illustrated in FIG. 4A Movable reflective mirror 40 of reflective means 4 illustrated in FIG. 4B makes portion 403 in the vicinity of the center thereof the fixed portion, and portions 401, 402 in the vicinity of the end portion of both ends portions capable of being displaced, respectively. In this example, these portions 401, 402 are made the application portions, and moment application mechanisms 51, 52, which are moment application means for displacing application portions 401, 402 by applying moment thereto, are connected to application portions 401, 402.

Comb drives 53, 54 are respectively connected to these moment application mechanisms 51, 52 at the end opposite the end to which application portions 401, 402 of movable reflective mirror 40 are connected. Comb drives 53, 54 respectively drive moment application mechanisms 51, 52 in the direction of the arrow shown in FIG 4B.

In the foregoing structure, when the ends of moment application mechanisms 51, 52 are driven pursuant to the movement of comb drives 53, 54, the entire application mechanisms 51, 52 move or deform. Here, moment is applied to application portions 401, 402 of movable reflective mirror 40 connected to these moment application mechanisms 51, 52, such portions are displaced thereby, and the entire reflective surface of movable reflective mirror 40 deforms in synchronization therewith.

Figure 5A:
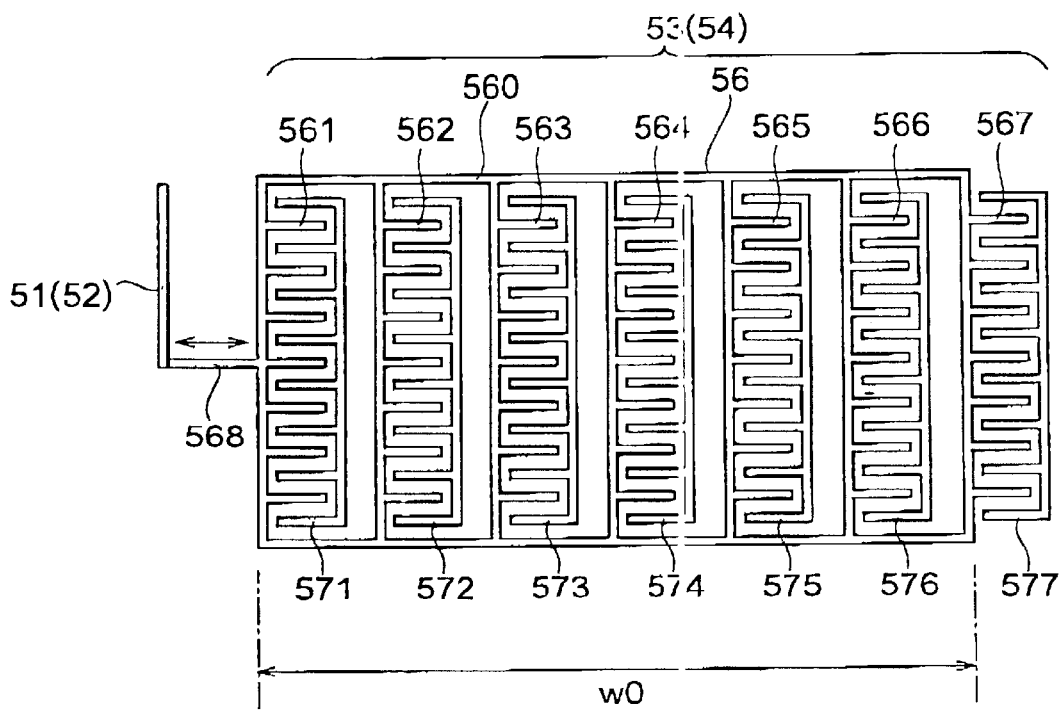
FIG. 5A and FIG. 5B are structural diagrams showing an example of the comb drive employed in the movable reflective mirror.

Further, as comb drives 53, 54 in reflective means 4 illustrated in FIG. 4B, for example, the comb drive structure shown in FIG. 5A is respectively used.

Comb drive 53 (54) in the present example comprises a structure of combining a comb-shaped electrode in 7 sections. Seven sections of comb-shaped electrodes 561 to 567 are provided, with respect to frame shape electrode 560 having a width w0 in the drive direction, to drive electrode 56 for driving momentum application mechanism 51 (52). This drive electrode 56 is established with the drive direction as a direction shown with the arrow in FIG. 5A, and connected to moment application mechanism 51 (52) via connection portion 568.

Seven sections of comb-shaped electrodes 571 to 577 are provided so as to mutually engage with corresponding comb-shaped electrode portions 561 to 567, respectively, with respect to the comb-shaped electrode portions 561 to 567 of these drive electrodes 56. These comb-shaped electrodes 571 to 577 are fixed to a substrate or the like to which is provided movable reflective mirror 40 and moment application mechanisms 51, 52 and, for example, are electrically connected to each other so as to have the same potential.

In comb drive 53 (54) having the foregoing electrode structure and in reflective means 4 comprising comb drives 53, 54, by applying power voltage between drive electrode 56 including comb-shaped electrode portions 561 to 567 and comb-shaped electrodes 571 to 577, drive electrode 56 moves in the predetermined drive direction, pursuant to static electricity with respect to the fixed comb-shaped electrodes 571 to 577. Here, the ends of moment application mechanisms 51, 52 are driven by the movement of comb drives 53, 54, and the entire reflective surface of movable reflective mirror 40 becomes deformed.

Figure 5B:
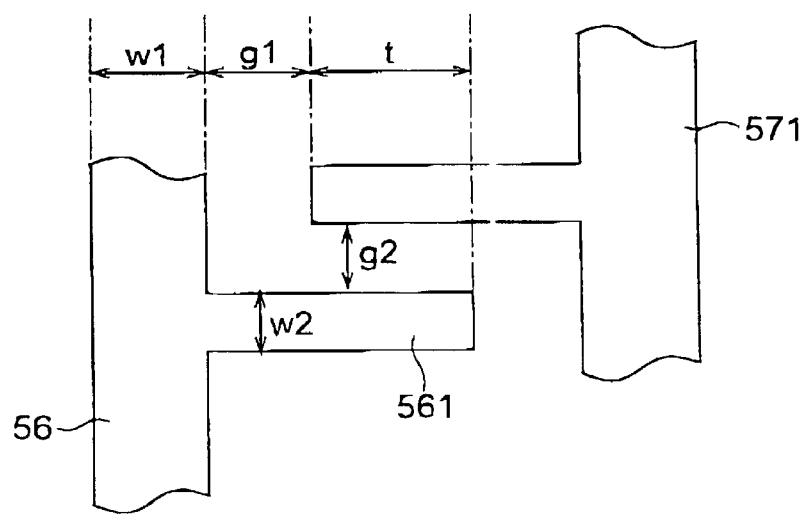

An example of a concrete structure of comb drive 53 (54) shown in FIG. 5A is explained with reference to the partially enlarged view of comb-shaped electrode portion 561 of drive electrode 56 and corresponding comb-shaped electrode 571 illustrated in FIG. 5B. Foremost, as the overall drive electrode 56, width in the longitudinal of frame-shaped electrode portion 560 was set to w0=610 μm, and structured as a 7-section electrode as depicted in FIG. 5A.

Further, regarding the structure and the like of the respective comb-shaped electrodes, the width of the comb-shaped electrode was set to w2=10 μm, the gap in the drive direction between the comb-shared electrodes in a state where drive electrode 56 is in its initial position was set to g1=60 μm, the gap between the combs in the direction perpendicular to the drive direction was set to g2=10 μm, the length of the overlapping portion of the comb-shaped electrodes was set to t=10 μm, the height of the respective electrodes was set to 50 μm, and the number of comb-shaped electrodes was set to 19.

As a result of examining the displacement of movable reflective mirror 40 upon employing the comb drive having the structure shown in FIG. 5A as comb drives 53, 54 for driving moment application mechanisms 51, 52 in reflective means 4 illustrated in FIG. 4B, the displacement of application portions 401, 402 of movable reflective mirror 40 was respectively 4 μm when applying 15V of power voltage (corresponds to applying force of 30 μN).

The dispersion that develops in an optical signal in an optical transmission system, and dispersion compensation using a variable dispersion compensator are further described while referencing FIG. 1 and FIG. 2. It is noted that in the following, optical intensity of an optical signal that is the subject of dispersion compensation is assumed as given by the value of amplitude |E| of that electric field, or the value of the square thereof.

An optical signal that is propagated through optical fiber transmission line L in an optical transmission system, as shown in FIG. 2, is generated in transmitter T so that optical intensity |E| has a predetermined signal waveform A, and transmitted as an input optical signal to the optical transmission system. This input optical signal has optical signal components that are spread out across a predetermined optical signal frequency band (wavelength band) with optical signal frequency $v_o$ (optical signal wavelength $\lambda_o = c/v_o$) as the median frequency.

When such an optical signal is propagated through optical fiber transmission line L, the dispersion of optical fiber transmission line L accumulates in the optical signal. The propagated optical signal then, as shown by signal waveform B in FIG. 2, develops waveform deterioration, where the signal waveform of optical intensity |E'| is distorted from signal waveform A of the input optical signal.

In variable dispersion compensator 1, phase shift, which is used to compensate the dispersion of each frequency component of optical signal, is applied to each frequency component of an optical signal that is the subject of dispersion compensation and in which such waveform deterioration has developed, so as to negate the phase shift from dispersion that has accumulated in optical fiber transmission line L in order to compensate the dispersion. Through this, an optical signal is obtained having signal waveform C of optical intensity |E"|, which has removed to the greatest extent possible the effects of dispersion due to being propagated through optical fiber transmission line L.

In more detail, in cases where there exists second order dispersion (dispersion) $D^{(2)}$ and third order dispersion (dispersion slope) $D^{(3)}$ in optical fiber transmission line L, the value of total dispersion D for the optical signal components of wavelength $\lambda$ (=c/v) is given by the following expression, wherein group delay time is assumed as τ and $\lambda_o$ is the median wavelength of the above-mentioned optical signal.

$$D(\lambda) = d\tau/d\lambda$$
$$= D^{(2)} + D^{(3)}(\lambda - \lambda_0)$$

When second order dispersion $D^{(2)}$ is made dominant in the total dispersion D, the group delay time τ for the optical signal component of wavelength λ becomes $$\tau(\lambda) = D^{(2)}(\lambda - \lambda_o).$$

At this point, phase shift φ due to dispersion that develops in each optical signal component of the optical signal that has propagated through optical fiber transmission line L, when the phase shift at median frequency $v_o$ (median wavelength $\lambda_o$) is given as 0, becomes the following.

$$\phi = -\pi c D^{(2)}((v-v_o)/v_o)^2$$

or when the rate of change of phase shift φ is $$d\phi/dv = -(2\pi c D^{(2)}/v_o^2) \times (v-v_o).$$

In other words, phase shift that has parabolic change with a center of median frequency $v_o$ develops in an optical signal that propagates through optical fiber transmission line L due to dispersion $D^{(2)}$.

Dispersion compensation is performed using variable dispersion compensator 1, which is shown in FIG. 1 and FIG. 3, for an optical signal in which such phase shift develops. Here, as shown in FIG. 1, the total width of the frequency band in the entire reflective surface of reflective mirror 40 of reflective means 4 that is to become the frequency band in which dispersion compensation is performed is given as $2\delta v$, and the dispersion compensation resolution, on the premise that dispersion compensation, which is conducted by respectively reflecting each of the frequency components of optical signals with the corresponding reflective surface of reflective mirror 40, is performed pursuant to a finite frequency resolution, is given as $\Delta v$.

Furthermore, in regards to each of the reflective surfaces of frequency width $\Delta v$ included in reflective mirror 40, the median frequency of the frequency component of the optical signal that is reflected by such reflective surfaces is given as $v_i$, and the phase shift that is applied for dispersion compensation in each frequency component of the optical signal is given as $\psi$.

The reflection position of each frequency component in accordance with each reflective surface included in reflective mirror 40 and the over all reflective surface shape of reflective mirror 40 pursuant thereto is set so that phase shift $\phi$ in optical fiber transmission line L at median frequency $v_i$ of each reflective surface of reflective mirror 40 is negated by making the phase shift applied to a frequency component of the optical signal due to the reflection at each reflective surface become $\psi = -\phi(v_i)$.

Once the reflection position for each of the reflective surfaces of frequency width $\Delta v$ included in reflective mirror 40 is set, each reflective surface is shifted to have the reflection position that is set by deforming the entire reflective surface of movable reflective mirror 40. Through this, a configuration that is capable of compensating dispersion in an optical transmission system is realized. Position d (see FIG. 1) of each reflective surface of movable reflective mirror 40, which applies phase shift $\psi = -\phi(v_i)$ can be found with the following expression, wherein the refractive index of the medium between optical combining/splitting unit 2 and reflective means 4 is given as n, $$d = c\phi(v_i)/4\pi n v_i.$$

When making the frequency resolution of the dispersion compensation $\Delta v$ as described above, it is preferable that the phase shift $\phi(v)$, which develops in optical signal, does not change drastically within the frequency range $\Delta v$ in order to perform dispersion compensation effectively to the optical signals. More specifically, it is preferable that the frequency resolution $\Delta v$ meet the conditions of the following expression relative to the rate of change $d\phi/dv$ of phase shift $\phi$.

$$|\Delta v \times (d\phi/dv)| \leq \pi$$

When second order dispersion $D^{(2)}$ is dominant in the total dispersion D, the absolute value of the rate of change $|(d\phi/dv)|$ of phase shift $\phi$ is maximized at the frequency components at the extremities of the frequency band, which are separated by frequency $v = v_o \pm \delta v$, namely by frequency $\delta v$ which is half of the total width $2\delta v$ from median frequency $v_0$, with that maximized value being $$|d\phi/dv|_{max} = 2\pi c D^{(2)} \delta v/v_o^2|.$$

Accordingly, the maximized value of dispersion $D^{(2)}$ that meets the above preferred conditions of $$|\Delta v \times (d\phi/dv)| \leq \pi$$

becomes $$|D^{(2)}|_{max} = v_o^2 / 2c \Delta v \delta v.$$

For example, in regards to the optical signal that becomes the subject of dispersion compensation, if that median frequency is given as $v_o = 189.1$ THz (median wavelength given as $\lambda_o = 1585$ nm), the half-width of the frequency band as $\delta v = 50$ GHz, and the frequency resolution of the dispersion compensation as $\Delta v = 5$ GHz, then it follows that the maximum dispersion capable of being compensated is $|D^{(2)}|_{max} = 240$ ps/nm. In addition, with similar conditions, if the half-width of the frequency band is given as $\delta v = 15$ GHz, and the frequency resolution as $\Delta v = 3$ GHz, then it follows that the maximum dispersion capable of being compensated is $|D^{(2)}|_{max} = 1300$ ps/nm.

Here, a more specific structural example of variable dispersion compensator 1 that is shown in FIG. 3 including AWG 2b is illustrated. If the interval between neighboring channels capable of being separated at the exit of second slab waveguide 24 (position resolution) is given as $\Delta x$, and the wavelength interval between the frequency components of the optical signal propagated through neighboring separable channels as $\Delta \lambda$, then the following expression is obtained.

$$\Delta x / \Delta \lambda = N_c f \Delta L / n_s \Delta x \lambda_o,$$

wherein $N_c$ is the group refractive index of the waveguide, f is the length of the slab waveguides along their length, $\Delta L$ is the optical path length difference of the channel waveguides in the array waveguide portion, and $n_s$ is the effective refractive index of the slab waveguides. Of these the group refractive index $N_c$ and effective refractive index $n_s$ are in the range of 1.5, respectively.

In this regard, if the median wavelength of the optical signal is given as $\lambda_o = 1550$ nm and the frequency band in which dispersion compensation is performed is $2\delta v = 100$ GHz (which correlates to wavelength band 0.8 nm), then the frequency resolution of this frequency band being divided into 10 parts becomes $\Delta v = 10$ GHz. Accordingly, the wavelength resolution is $\Delta \lambda = 0.08$ nm. Furthermore, the interval between channels becomes $\Delta x = 20$ μm.

If these numeric values are substituted, then as a structural condition that should be met for AWG 2b of variable dispersion compensator 1, it is found that $$f \Delta L = 7.75 \times 10^{-6} \, m.$$

It is possible to meet this condition if with a structure, for example, where the slab waveguide is set with f=30 mm, and the array waveguide portion is set with $\Delta L = 258$ μm.

It is noted that it is preferable that dispersion compensation frequency band $2\delta v$ be set so that it sufficiently includes a frequency range throughout which the optical signal component of the optical signal that is to become the subject of dispersion compensation is distributed.

Furthermore, if the optical signal that is to become the subject of dispersion compensation is a multi-wavelength optical signal comprising a plurality of optical signals having optical signal wavelengths differing from each other, then in cases where dispersion compensation is performed for a single optical signal included in the multi-wavelength optical signal, it is possible for the frequency interval between neighboring optical signals to be total frequency width 2δv. Furthermore, when the total frequency width 2δv is made larger than the frequency interval between neighboring optical signals (e.g. in integral multiples), the structure becomes capable of dispersion compensating the plurality of optical signals included a multi-wavelength optical signal.

Furthermore, in regards to the bit rate (modulation rate) of the optical signal, it is preferable that the bit rate be 10 Gbps or faster, and even more preferably, 40 Gbps or faster. The development of dispersion in the optical transmission line becomes particularly problematic with such high-speed bit rates; however, even in such cases, by adopting the configuration described above in a variable dispersion compensator, favorable dispersion compensation of the optical signal can be performed with sufficient accuracy. However, needless to say, variable dispersion compensator 1 may be effectively adopted for optical signals with bit rates that are lower than those mentioned above.

Furthermore, it is preferable that the shape of the reflecting surface of the reflective mirror that comprises the reflective means be somewhat parabolic in relation to the frequency component to be reflected. Through this, in cases where second order dispersion $D^{(2)}$ becomes dominant in the dispersion that develops in the optical transmission line, it is possible to achieve favorable dispersion compensation for an optical signal throughout the entire frequency band that becomes the subject of dispersion compensation.

Simulations were performed by applying the specific conditions in the optical transmission system and variable dispersion compensator having the configuration mentioned above, and the results were confirmed with regard to dispersion compensation of the optical signal and waveform deterioration of the optical signal due to dispersion in the optical transmission line.

As for the optical signal that was to become the subject of dispersion compensation, the median frequency was set at $v_o$=189.1 THz (median wavelength of $\lambda_o$=1585 nm), in addition, the modulation scheme was set to NRZ, and modulation rate (bit rate) M set to either 10 Gbps or 40 Gbps. In addition, the waveform of the optical pulse of the optical signal was set to be a super-Gaussian, non-chip form. Here, if the duration of the one-bit signal is given as $2t_o$(=1/M), then the signal waveform of the optical signal is applied as $$E(t)=\exp\{-\log2/2\times(t/t_0)^{2m}\},$$

where in m is given as the parameter that determines the optical pulse form and here it is set to m=2.

Furthermore, random codes of $2^9$=512 bits were transmitted as the optical signal to actually be subjected to dispersion compensation, and the obtained signal waveform was estimated through the eye pattern displayed.

To begin with, an example of dispersion compensation in the case where the bit rate was made to be M=10 Gbps is illustrated. With this 10 Gbps bit rate, the clock for the signal period is 100 ps.

Figure 6A:
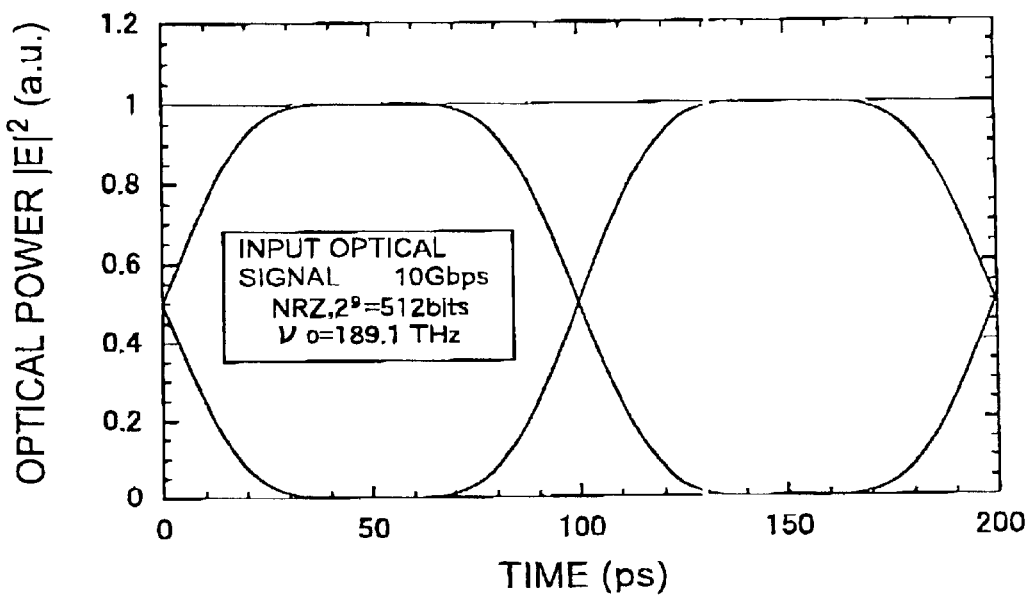
FIGS. 6A and 6B are graphs of an example of (A) the input optical signal, and (B) the pre-dispersion compensation output optical signal in a 10 Gbps optical transmission system.
Figure 6B:
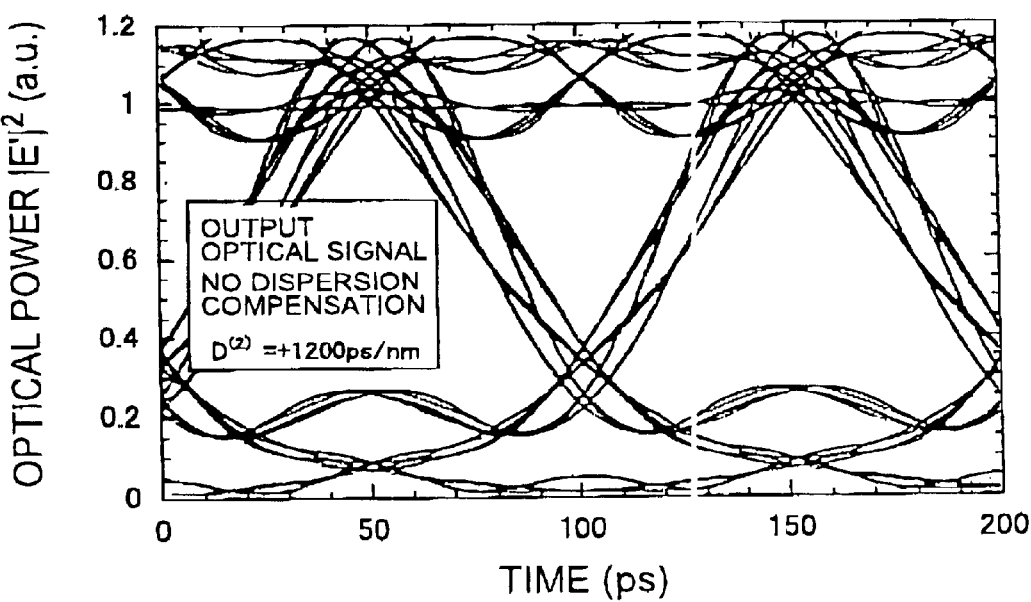

FIGS. 6A and 6B are graphs illustrating an example of the optical signal that the 10 Gbps optical transmission system transmits, wherein FIG. 6A illustrates the signal waveform of the input optical signal immediately after the transmitter (refer to signal waveform A in FIG. 2); and FIG. 6B illustrates the signal waveform of the output optical signal before dispersion compensation (without dispersion compensation) (refer to signal waveform B in FIG. 2).

The input optical signal having the signal waveform shown in FIG. 6A has frequency components in a frequency range of approximately ±15 GHz, with optical signal frequency $v_o$=189.1 THz as the median. In this regard, when the dispersion that develops in the optical signal due to propagation in the optical transmission line is set as $D^{(2)}$=+1200 ps/nm, $D^{(3)}$=0 ps/nm$^2$, the signal waveform in the post-propagation output optical signal becomes a waveform with developed waveform deterioration due to dispersion, as shown in FIG. 6B.

Figure 7A:
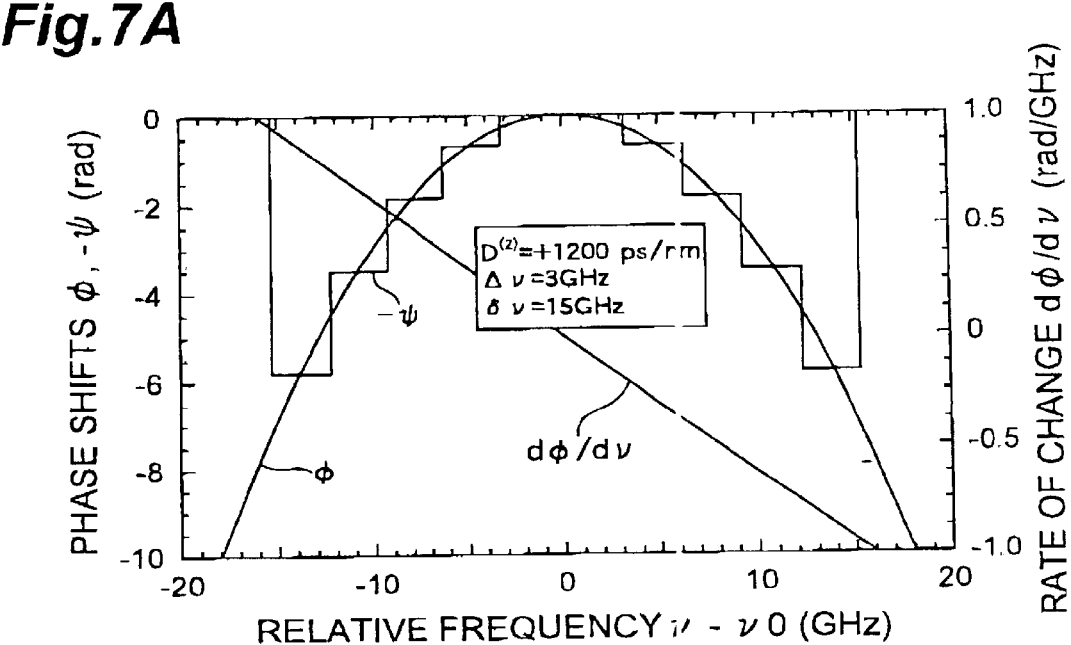
FIGS. 7A and 7B are graphs of an example of (A) the phase shift of an optical signal, and (B) the post-dispersion compensation output optical signal in a 10 Gbps optical transmission system.
Figure 7B:
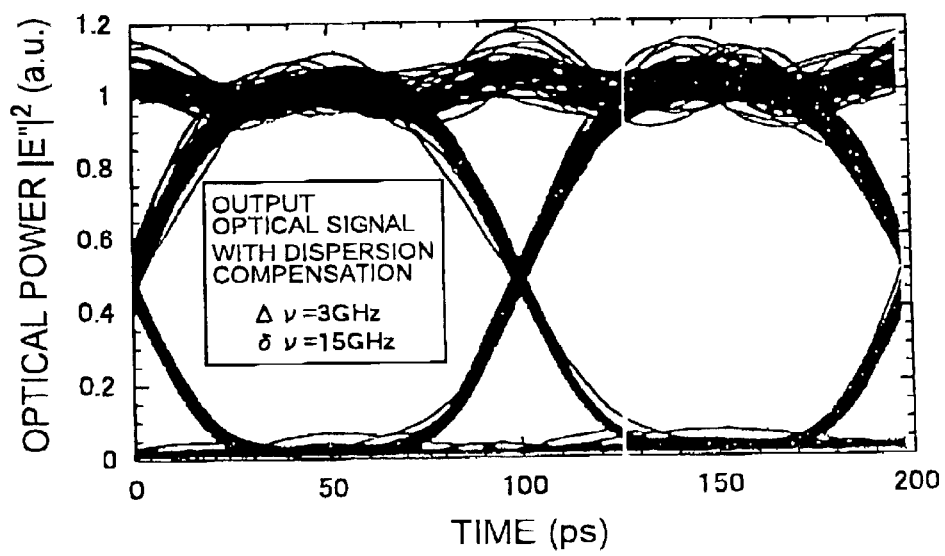

FIGS. 7A and 7B are graphs showing an example of dispersion compensation for an optical signal that is transmitted by a 10 Gbps optical transmission system, wherein FIG. 7A illustrates the phase shift of the optical signal, and in addition, FIG. 7B illustrates the waveform of the output optical signal after dispersion compensation (with dispersion compensation) (refer to signal waveform C in FIG. 2).

Here, in FIG. 7A, the horizontal axis shows the relative frequency $v-v_o$(GHz) vis-à-vis median frequency $v_o$=189.1 THz. In addition, the vertical axis shows the rate of change of phase shift dφ/dv (rad/GHz) corresponding to dispersion $D^{(2)}$=+1200 ps/nm and phase shifts φ and −ψ (rad).

For each frequency component of the input optical signal shown in FIG. 6A, due to dispersion $D^{(2)}$ in the above-mentioned optical transmission line, the parabolic phase shift φ shown in FIG. 7A develops in the post-propagation output optical signal shown in FIG. 6B. In this regard, in this example, dispersion compensation is performed with the half-width of frequency band being set to δv=15 GHz, and frequency resolution set to Δv=3 GHz.

At this point, in variable dispersion compensator 1, phase shift ψ, which is shown as the graph of −ψ in FIG. 7A, is applied to each frequency component of the optical signal. In this graph of phase shift ψ with a stepped-shape at frequency width Δv=3 GHz, the frequency resolution is Δv, and corresponds to the shape of the reflective surface of reflective mirror 40 on the premise that the phase shift within the range of frequency width Δv is fixed. In other words, the direction of the horizontal axis of phase shift φ corresponds to the position of each reflective surface of reflective mirror 40 along the v-axis. In addition, the direction of the vertical axis corresponds to the position of each reflective surface of reflective mirror 40 along the d-axis (refer to FIG. 1).

Reflective mirror 40, as shown in FIG. 7A, is configured so that the two phase shifts match with $-\psi=\phi(v_i)$ at the respective median frequency $v_i$ for the frequency component of frequency width Δv reflected by each reflective surface. With such configuration, phase shift φ, which develops in the optical signal along the optical transmission line, is negated to the greatest extent possible by phase shift ψ, which is applied by variable dispersion compensator 1. As shown in FIG. 7B by the signal waveform of the post-dispersion compensation output optical signal, dispersion in the optical signal is sufficiently compensated.

Figure 8A:
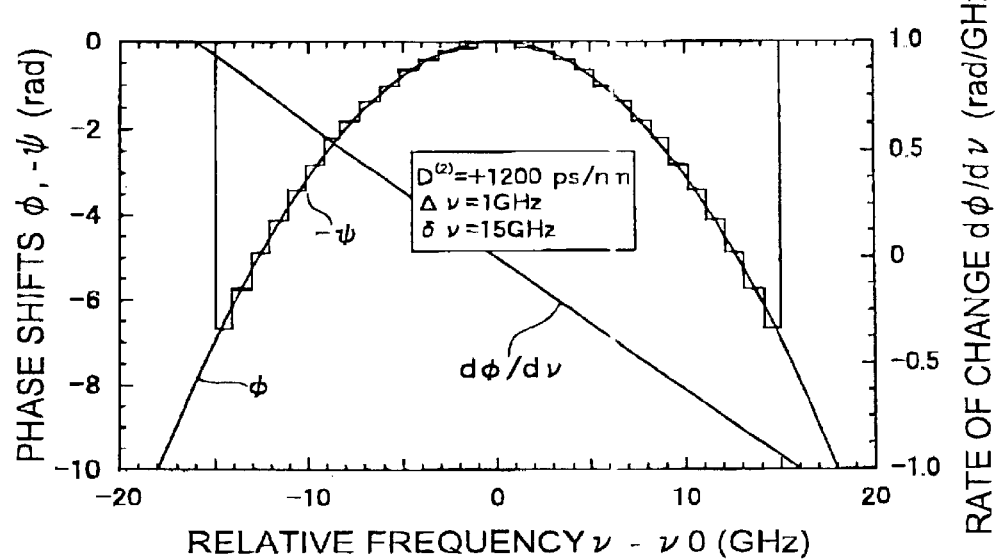
FIGS. 8A and 8B are graphs of another example of (A) the phase shift of an optical signal, and (B) the post-dispersion compensation output optical signal in a 10 Gbps optical transmission system.
Figure 8B:
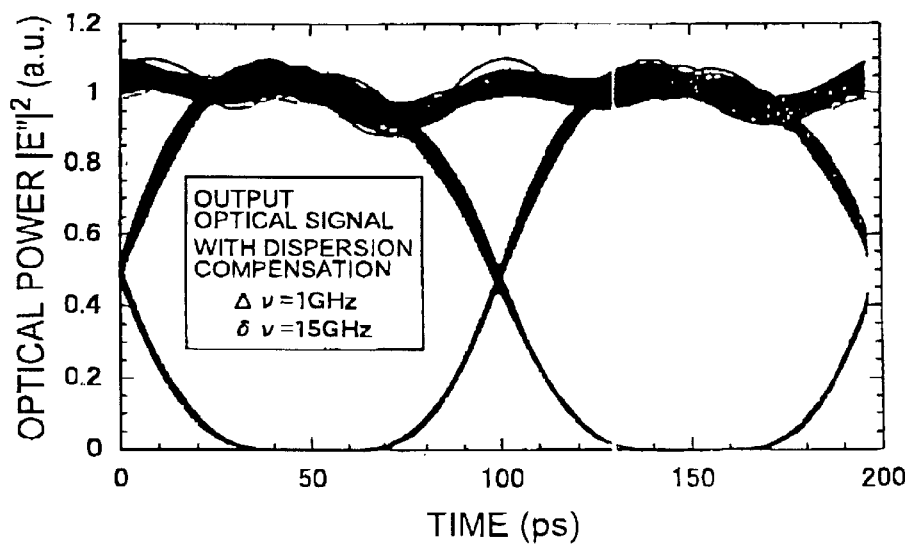

FIGS. 8A and 8B are graphs of another example of dispersion compensation of an optical signal propagated by a 10 Gbps optical transmission system wherein FIG. 8A shows the phase shift of the optical signal, and in addition, FIG. 8B shows the signal waveform of the post-dispersion compensation output optical signal. It is noted that in the graph of FIG. 8A, the rate of change of phase shift dφ/dv and phase shift φ are the same as that shown in FIG. 7A For each frequency component of the input optical signal shown in FIG. 6A, due to dispersion $D^{(12)}$ in the above-mentioned optical transmission line, the parabolic phase shift φ shown in FIG. 8A develops in the post-propagation output optical signal shown in FIG. 6B. In this regard, in this example, dispersion compensation is performed with the half-width of frequency band being set to δv=15 GHz, and frequency resolution set to Δv=1 GHz.

At this point, in variable dispersion compensator 1, phase shift ψ, which is shown as the graph of −ψ in FIG. 8A, is applied to each frequency component of the optical signal. In this graph of phase shift ψ with a stepped-shape at frequency width Δν=1 GHz, the frequency resolution is Δν, and corresponds to the shape of the reflective surface of reflective mirror 40 on the premise that the phase shift within the range of frequency width Δν is fixed.

Reflective mirror 40, as shown in FIG. 8A, is configured so that the two phase shifts match with −ψ=φ($ν_i$) at the respective median frequency $ν_i$ for the frequency component of frequency width Δν reflected by each reflective surface. With such configuration, phase shift φ, which develops in the optical signal along the optical transmission line, is negated to the greatest extent possible by phase shift ψ, which is applied by variable dispersion compensator 1. As shown in FIG. 8B by the signal waveform of the post-dispersion compensation output optical signal, dispersion in the optical signal is sufficiently compensated. In particular, in this example, by making the frequency resolution Δν 1 GHz, which is smaller than the 3 GHz of the example shown in FIGS. 7A and 7B, the accuracy of dispersion compensation is improved.

Next, an example of dispersion compensation in the case where the bit rate is made to be M=40 Gbps is shown. With this 40 Gbps bit rate, the clock that is to become the period of the signal is 25 ps.

Figure 9A:
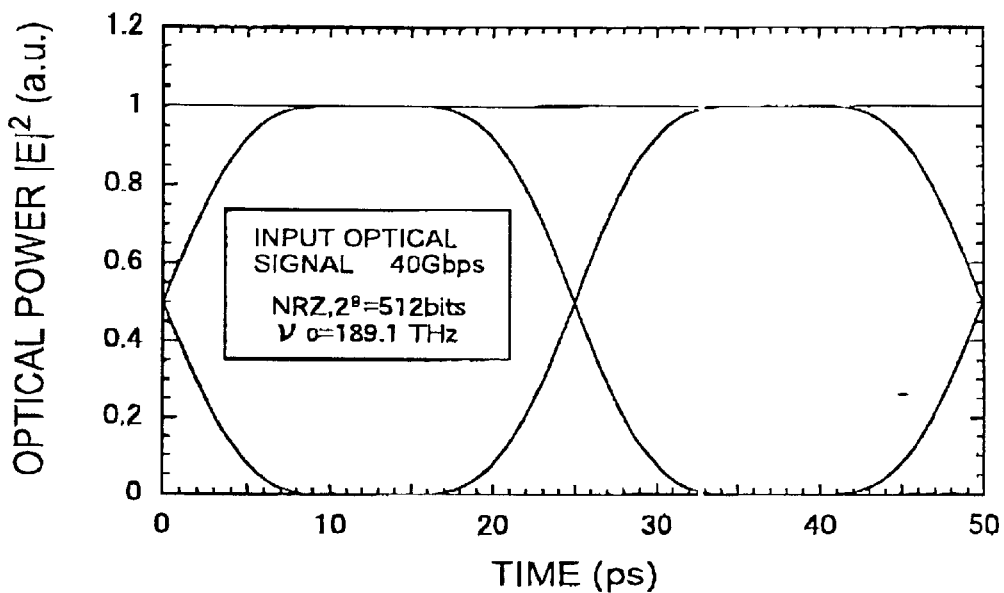
FIGS. 9A and 9B are graphs of an Example of (A) the input optical signal, and (B) the pre-dispersion compensation output optical signal in a 40 Gbps optical transmission system.
Figure 9B:
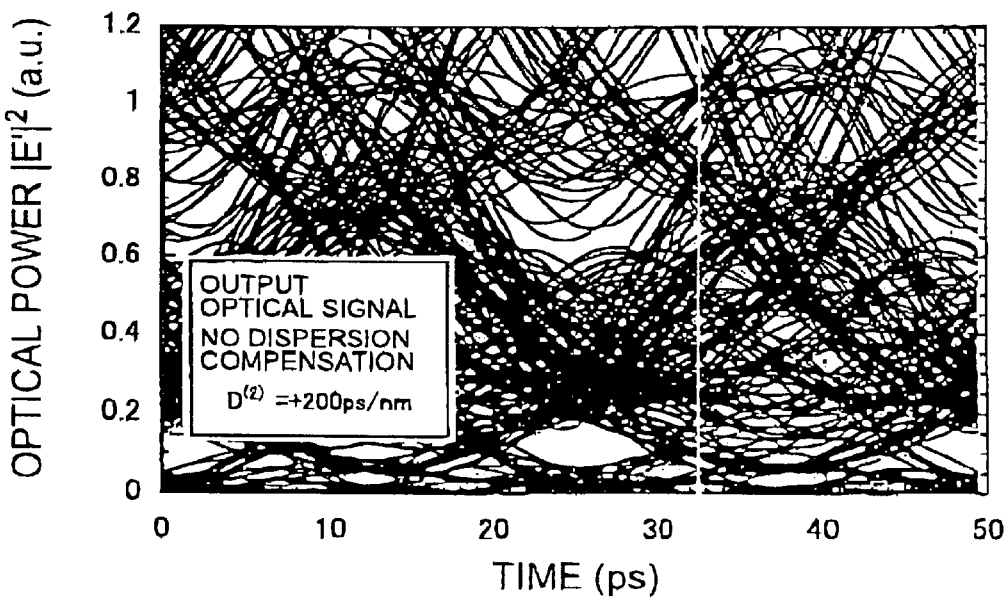

FIGS. 9A and 9B are graphs illustrating an example of the optical signal that the 40 Gbps optical transmission system transmits, wherein FIG. 9A illustrates the signal waveform of the input optical signal immediately after the transmitter; and FIG. 9B illustrates the signal waveform of the output optical signal before dispersion compensation.

The input optical signal having the signal waveform shown in FIG. 9A has frequency components in a frequency range of approximately ±50 GHz, with optical signal frequency $ν_o$=189.1 THz as the median. In this regard, when the dispersion that develops in the optical signal due to propagation in the optical transmission line is set as $D^{(2)}$=+200 ps/nm, $D^{(3)}$=0 ps/nm², the signal waveform in the post-propagation output optical signal becomes a waveform with developed waveform deterioration due to dispersion, as shown in FIG. 9B.

Figure 10A:
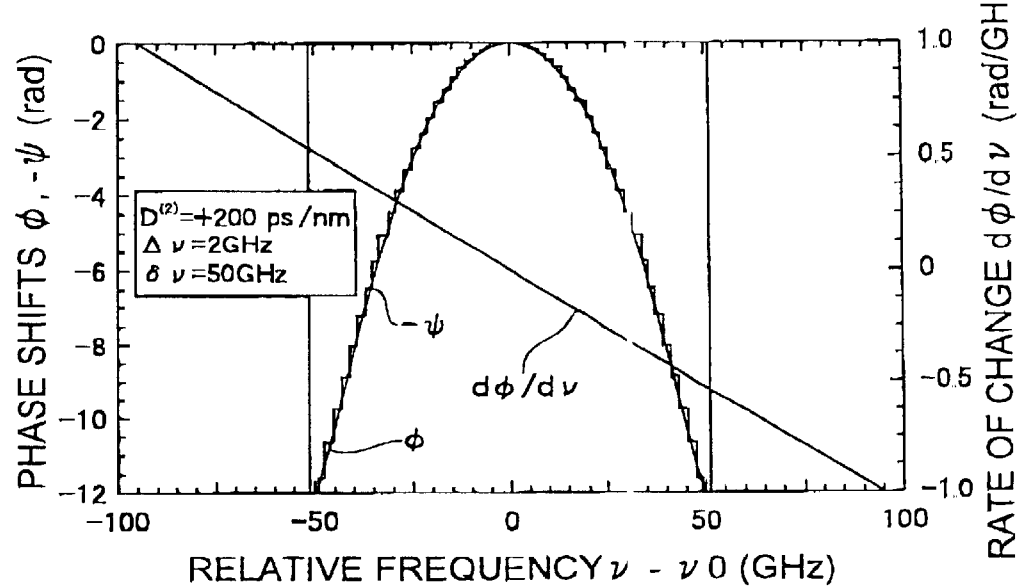
FIGS. 10A and 10B are graphs of an example of (A) the phase shift of an optical signal, and (B) the post-dispersion compensation output optical signal in a 40 Gbps optical transmission system.
Figure 10B:
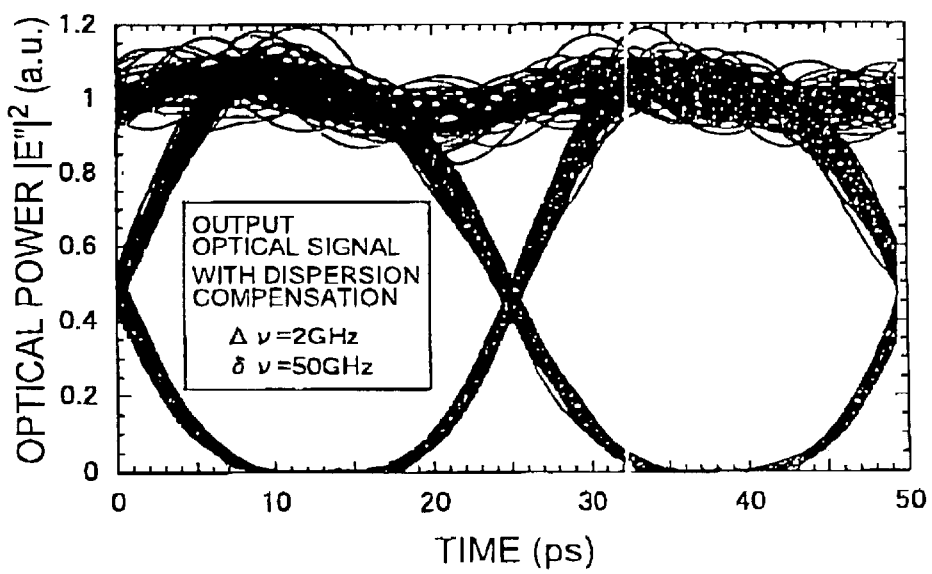

FIGS. 10A and 10B are graphs showing an example of dispersion compensation for an optical signal that is transmitted by a 40 Gbps optical transmission system, wherein FIG. 10A illustrates the phase shift of the optical signal, and in addition, FIG. 10B illustrates the signal waveform of the output optical signal after dispersion compensation.

Here, in FIG. 10A, the horizontal axis shows the relative frequency $ν-ν_o$ (GHz) vis-à-vis median frequency $ν_o$=189.1 THz. In addition, the vertical axis shows the rate of change of phase shift dφ/dν (rad/GHz) corresponding to dispersion $D^{(2)}$=+200 ps/nm and phase shifts φ and −ψ (rad).

For each frequency component of the input optical signal shown in FIG. 9A, due to dispersion $D^{(2)}$ in the above-mentioned optical transmission line, the parabolic phase shift φ shown in FIG 10A develops in the post-propagation output optical signal shown in FIG. 9B. In this regard, in this example, dispersion compensation is performed with the half-width of frequency band being set to δν=50 GHz, and frequency resolution set to Δν=2 GHz.

At this point, in variable dispersion compensator 1, phase shift ψ, which is shown as the graph of −ψ in FIG. 10A, is applied to each frequency component of the optical signal. In this graph of phase shift ψ with a stepped-shape at frequency width Δν=2 GHz, the frequency resolution is Δν, and corresponds to the shape of the reflective surface of reflective mirror 40 on the premise that the phase shift within the range of frequency width Δν is fixed.

Reflective mirror 40, as shown in FIG. 10A, is configured so that the two phase shifts −ψ=φ ($ν_i$) match at the respective median frequency $ν_i$ for the frequency component of frequency width Δν reflected by each reflective surface. With such configuration, phase shift φ, which develops in the optical signal along the optical transmission line, is negated to the greatest extent possible by phase shift ψ, which is applied by variable dispersion compensator 1. As shown in FIG. 10B by the signal waveform of the post-dispersion compensation output optical signal, dispersion in the optical signal is sufficiently compensated.

Here, when employing the structure of fixing the portion in the vicinity of the end portions on both sides of movable reflective mirror 40 and deforming the reflective surface, in comparison to the structure of fixing the portion in the vicinity of the center of movable reflective mirror 40 and deforming the reflective surface, force to be applied to reflective mirror 40 is smaller in the structure of fixing the portion in the vicinity of the center and driving the portion in the vicinity of the end portion.

Figure 11A:
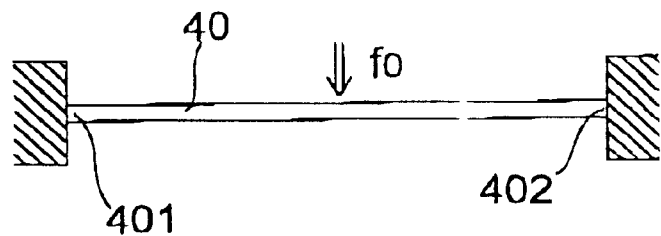
FIG. 11A and FIG. 11B are diagrams explaining the driving method of the movable reflective mirror.
Figure 11B:
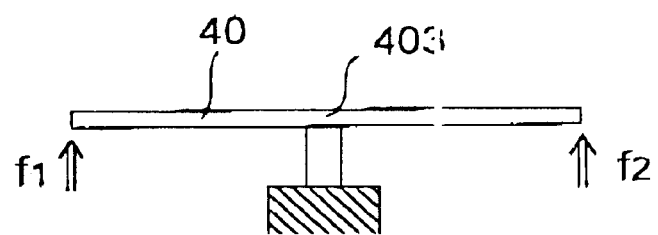

In other words, as shown in FIG. 11A and FIG. 11B, when comparing the case of fixing portions 401, 402 in the vicinity of end portions on both sides thereof with the case of fixing portion 403 in the vicinity of the center with respect to movable reflective mirror 40 having the same shape, with the structure of fixing portions 401, 402 in the vicinity of the end portions (FIG. 11A), force of f0=8.7×10⁻⁴ μN was required in order to displace the portion in the vicinity of the center 5 μm.

Contrarily, with the structure of fixing portion 403 in the vicinity of the center (FIG. 11B), when applying force of f1=f2=f0/2=4.35×10⁴ μN, respectively, to the portion in the vicinity of the end portion so as to make the total force equal the aforementioned example, the displacement of the portion in the vicinity of the end portion approximately quadrupled to 19.6 μm. Moreover, when making the displacement of movable reflective mirror 40 similar to the above at 5 μm, the total force to be applied to the portion in the vicinity of the end portion became approximately ¼ the force at approximately 2×10⁴ μN.

As described above, by employing the structure of driving the portion in the vicinity of the end portion of the movable mirror, the force necessary to be applied for driving the movable mirror becomes small, and the entire reflective surface thereof can easily be deformed.

The variable dispersion compensator according to the present invention and the optical transmission system comprising the same are not limited to the embodiments described above, and may be modified in various forms. For example, the optical combining/splitting unit, which performs splitting and combining of the optical signal is not limited to an AWG, but various elements may also be used, or alternatively, the optical splitting unit and optical combining unit may also be provided separately. Furthermore, in regards to the splitting of the optical signal, splitting may be performed so as to divide into a plurality of frequency components, for example, according to the configuration of the reflecting means, or alternatively, splitting may also be performed into a continuous spectral shape by frequency.

Figure 12:
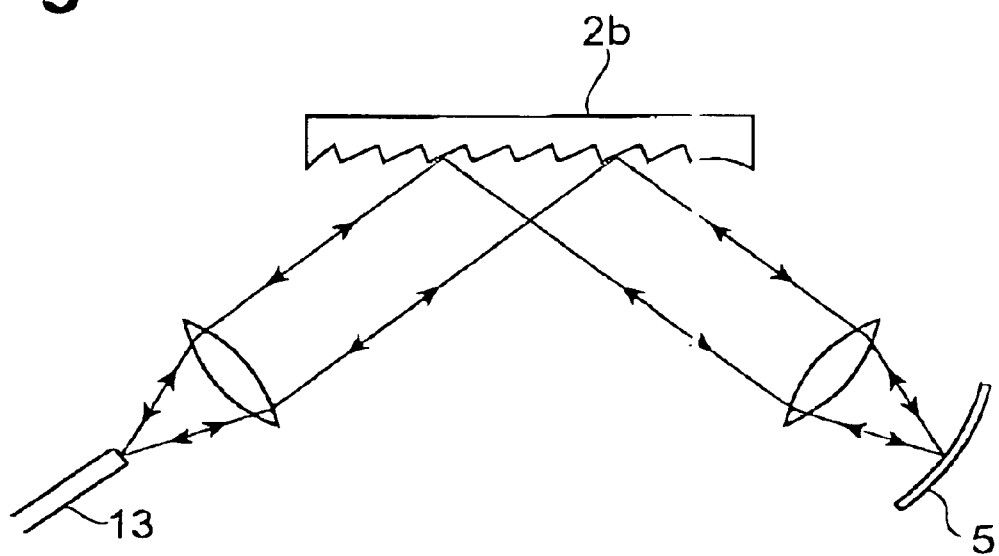
FIG. 12 is a block diagram that illustratively shows another embodiment of a variable dispersion compensator.

FIG. 12 is a block diagram that illustratively shows another embodiment of the variable dispersion compensator. In this embodiment, the optical signal from optical fiber transmission line 13, which is used for dispersion compensation, is input to diffractive grating 2b, which is an optical combining/splitting means, and is reflected for every frequency component at reflecting means 5. Each of the reflected frequency components is combined to become the post-dispersion compensation optical signal again by diffractive grating 2b, and is input towards optical fiber transmission line 13.

Figure 13:
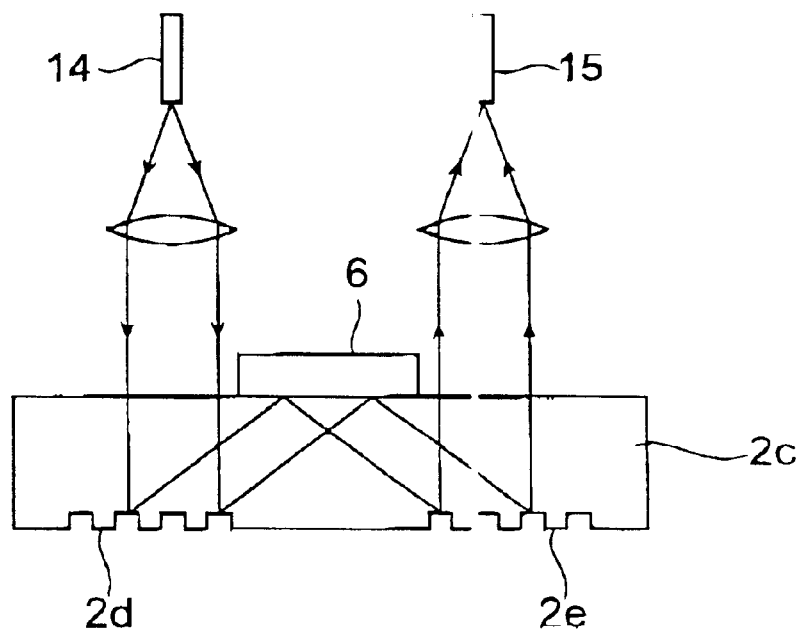
FIG. 13 is a block diagram that illustratively shows another embodiment of a variable dispersion compensator.

FIG. 13 is a block diagram that illustratively shows another embodiment of the variable dispersion compensator. In this embodiment, silicon oxide (SiO$_2$) plate 2c, which comprises two diffractive gratings 2d and 2e on the underside thereof, is used as optical combining/splitting means. The optical signal from optical fiber transmission line 14, which is used for input, is input to diffractive grating 2d, which is optical splitting means, after being incident on the top surface of plate 2c, and is reflected for every frequency component at reflecting means 6 Each of the reflected frequency components is then combined at refractive grating 2e, which is optical combining means, to become the post-dispersion compensation optical signal, and is input toward optical fiber transmission line 15, which is used for output, through the top of plate 2c.

Besides these structural examples, optical splitting means, reflecting means, and optical combining means, or combinations thereof, are possible for adaptation of the various respective figurations.

The variable dispersion compensator and optical transmission system according to the present invention, as detailed in the above, are superior in the precision and controllability of dispersion compensation, and may be used as the variable dispersion compensator and optical transmission system in which the optical circuit thereof will be miniaturized. Namely, in accordance with a variable dispersion compensator in which the optical path length difference from an optical splitting means, through a reflecting means, until an optical combining means is used to apply phase shift to each frequency component of an optical signal, and also, the phase shift is changed using a reflecting means having a variable reflection position for each frequency component, make it possible to compensate dispersion that develops in an optical signal accurately and with favorable controllability. Furthermore, since dispersion compensation is controlled only with reflecting means, it is possible to simplify the structure of an optical circuit, and accordingly, allow the size reduction of the optical circuit. Moreover, according to the structure deforming the portion in the vicinity of the end portion of the movable mirror with a moment application means, the force necessary in application for reforming the movable mirror becomes small, and the entire reflective surface thereof can be deformed easier.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A variable dispersion compensator, which applies a phase shift to an optical signal to compensate dispersion in the optical signal, comprising:

optical splitting means, which inputs an optical signal that is to become the subject of dispersion compensation, and splits said optical signal for every frequency component within a predetermined frequency band;

reflecting means, which reflects each of said respective frequency components that are split by said optical splitting means to apply a predetermined phase shift to each frequency component, and is configured with the reflection position for each of said respective frequency components being movable in the direction of optical signal propagation; and optical combining means, which combines said frequency components reflected by said reflecting means to give a dispersion compensated optical signal;

wherein said reflective means is constituted by a single reflective mirror, said single reflective mirror is a movable mirror capable of moving each of its reflective surfaces corresponding to said frequency component in said optical signal propagation direction by deforming the entire reflective surface thereof; and wherein said movable mirror, which is said single reflective mirror, is designed such that the entire reflective surface thereof is deformed by applying a moment to application portions provided respectively to the vicinity of the end portion on both sides by means of a moment application means, while fixing a fixed portion provided to the vicinity of the center thereof.

2. A variable dispersion compensator according to claim 1, characterized by said optical splitting means and said optical combining means comprising a single optical combining/splitting means.

3. A variable dispersion compensator according to claim 1, characterized by the shape of the reflective surface of said reflective mirrors, which configures said reflecting means, being approximately parabolic in relation to said frequency component to be reflected.

4. An optical transmission system characterized by comprising an optical transmission line, which propagates an optical signal having a frequency component within a predetermined frequency band; and the variable dispersion compensator according to claim 1, which is disposed at a predetermined position upon said optical transmission line and compensates dispersion that develops in said optical signal propagated through said optical transmission line.

5. An optical transmission system according to claim 4, characterized by the bit rate of said optical signal being 10 Gbps or faster.

* * * * *